US009954460B2

(12) United States Patent
Chang et al.

(10) Patent No.: US 9,954,460 B2
(45) Date of Patent: Apr. 24, 2018

(54) VOLTAGE CONTROL DEVICE WITH GATE CAPACITOR CHARGING AND DISCHARGING

(71) Applicant: MACROBLOCK. INC., Hsinchu (TW)

(72) Inventors: Lon-Kou Chang, Hsinchu (TW); Che-Wei Chang, Hsinchu (TW); Ting-Ta Chiang, Hsinchu (TW); Shi-Jie Liao, Hsinchu (TW)

(73) Assignee: MACROBLOCK, Inc., Hsinchu (TW)

( * ) Notice: Subject to any disclaimer, the term of this patent is extended or adjusted under 35 U.S.C. 154(b) by 0 days.

(21) Appl. No.: 15/288,606

(22) Filed: Oct. 7, 2016

(65) Prior Publication Data

US 2017/0110979 A1    Apr. 20, 2017

(30) Foreign Application Priority Data

Oct. 19, 2015    (TW) .............................. 104134225 A (51) Int. Cl.
| | |
|---|---|
| *G05F 1/563* | (2006.01) |
| *H02M 7/04* | (2006.01) |
| *H02M 1/42* | (2007.01) |
| *H05B 33/08* | (2006.01) |

(Continued)

(52) U.S. Cl.
CPC .............. *H02M 7/04* (2013.01); *G05F 1/563* (2013.01); *H02M 1/42* (2013.01); *H05B 33/0827* (2013.01); *G05F 1/577* (2013.01); *H02M 1/15* (2013.01)

(58) Field of Classification Search
CPC . G05F 1/56; G05F 1/561; G05F 1/562; G05F 1/563; G05F 1/575; G05F 1/577
See application file for complete search history.

(56) References Cited

U.S. PATENT DOCUMENTS

| | | | | |
|---|---|---|---|---|
| 5,654,628 A | * | 8/1997 | Feldtkeller | ................ G05F 1/56 323/280 |
| 6,680,837 B1 | * | 1/2004 | Buxton | .................. H02H 3/087 327/309 |

(Continued)

FOREIGN PATENT DOCUMENTS

| | | |
|---|---|---|
| JP | 2012080456 A | 4/2012 |
| JP | 2013115003 A | 6/2013 |

OTHER PUBLICATIONS

Office Action issued to Japanese counterpart application No. 2016-203617 by the JPO dated Oct. 3, 2017.

*Primary Examiner* — Harry Behm
(74) *Attorney, Agent, or Firm* — The Mueller Law Office, P.C.

(57) ABSTRACT

A voltage control device includes an output module and a control module. The output module provides an output current at an output terminal thereof based on a control voltage. The control module includes a comparing circuit, a capacitor, a charging circuit and a discharging circuit. The comparing circuit compares a to-be-compared voltage, which is associated at least with a to-be-controlled voltage at the output terminal of the output module, with a predetermined reference voltage to generate a comparison signal. The capacitor provides the control voltage. The charging circuit is operable to charge the capacitor based on the comparison signal. The discharging circuit is operable to discharge the capacitor based on the comparison signal.

14 Claims, 11 Drawing Sheets

(51) Int. Cl.
*H02M 1/15* (2006.01)
*G05F 1/577* (2006.01)

(56) References Cited

U.S. PATENT DOCUMENTS

| | | | | |
|---|---|---|---|---|
| 7,683,553 | B2* | 3/2010 | Fong | H02J 1/08 |
| | | | | 315/185 R |
| 2006/0012354 | A1* | 1/2006 | Nunokawa | G05F 1/575 |
| | | | | 323/273 |
| 2009/0322295 | A1* | 12/2009 | Scoones | G05F 1/56 |
| | | | | 323/282 |
| 2013/0285630 | A1* | 10/2013 | Wang | G05F 1/10 |
| | | | | 323/275 |

\* cited by examiner

VOLTAGE CONTROL DEVICE WITH GATE CAPACITOR CHARGING AND DISCHARGING

CROSS-REFERENCE TO RELATED APPLICATION

This application claims priority of Taiwanese Patent Application No. 104134225, filed on Oct. 19, 2015.

FIELD

The disclosure relates to voltage control, and more particularly to a voltage control device and a driving system using the same.

BACKGROUND

A conventional power supply device for an LED (light emitting diode) module uses a single-stage power factor correction scheme, and generates, based on an alternating current (AC) input voltage of 50 Hz or 60 Hz, a direct current (DC) driving current to drive the LED module. The driving current generally has a relatively large ripple component at 100 Hz or 120 Hz, resulting in flickering of light emitted from the LED module which may cause visual fatigue of a user.

SUMMARY

Therefore, an object of the disclosure is to provide a voltage control device that can alleviate the drawback of the prior art, and a driving system using the same.

According to one aspect of the disclosure, the voltage control device includes an output module and a control module. The output module has an input terminal that receives a control voltage, and an output terminal, and provides an output current at the output terminal thereof based on the control voltage. The control module includes a comparing circuit, a capacitor, a charging circuit and a discharging circuit. The comparing circuit is coupled to the output terminal of the output module for receiving a to-be-controlled voltage thereat, and compares a to-be-compared voltage, which is associated at least with the to-be-controlled voltage, with a predetermined reference voltage to generate a comparison signal. The capacitor is coupled between the input terminal of the output module and a reference node, and provides the control voltage to the input terminal of the output module. The charging circuit is coupled to the comparing circuit and the input terminal of the output module, receives the comparison signal from the comparing circuit, and is operable to charge the capacitor based on the comparison signal. The discharging circuit is coupled to the comparing circuit and the input terminal of the output module, receives the comparison signal from the comparing circuit, and is operable to discharge the capacitor based on the comparison signal.

According to another aspect of the disclosure, the driving system includes the voltage control device described above and a power supply device. The output terminal of the output module is used to be coupled to a load. The power supply device is used to be coupled to the load, generates a supply current, and provides, based on the supply current, a driving current to drive the load. The output current flows through the load, and constitutes at least a portion of the driving current.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
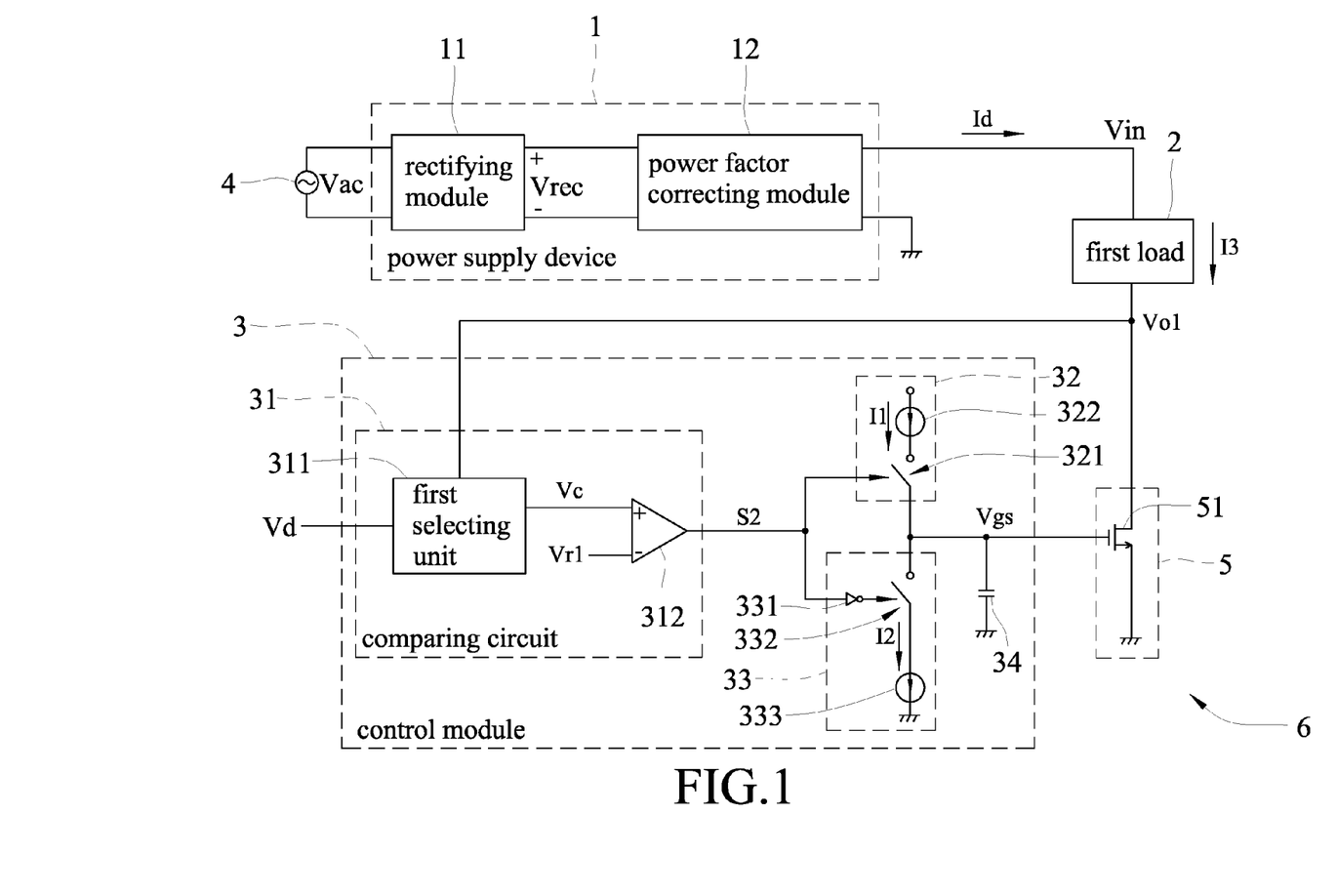
FIG. 1 is a circuit block diagram illustrating a first embodiment of a driving system according to the disclosure.

Referring to FIG. 1, a first embodiment of a driving system according to the disclosure includes a power supply device 1 and a voltage control device 6.

The power supply device 1 is used to be coupled to a first load 2 (e.g., a light emitting device), generates a DC (direct current) supply current, and provides, based on the supply current, a DC driving current (Id) to drive the first load 2. In this embodiment, the power supply device 1 includes a rectifying module 11 and a power factor correcting module 12. The rectifying module 11 is used to be coupled to an AC (alternating current) power source 4 for receiving an AC input voltage (Vac) therefrom, and rectifies the AC input voltage (Vac) to generate a rectified voltage (Vrec). The power factor correcting module 12 is coupled to the rectifying module 11 for receiving the rectified voltage (Vrec) therefrom, and is used to be coupled further to the first load 2. The power factor correcting module 12 generates the supply current based on the rectified voltage (Vrec), and provides, based on the supply current, the driving current (Id) for driving the first load 2. The power factor correcting module 12 may further allow a current provided by the AC power source 4 to have a phase that follows a phase of the AC input voltage (Vac) provided by the same, so as to attain a relatively high power factor.

The voltage control device 6 of this embodiment includes a first output module 5 and a control module 3.

The first output module 5 has an input terminal that receives a first control voltage (Vgs), and a first output terminal that is used to be coupled to the first load 2. The first output module 5 provides a first output current (I3) at the first output terminal thereof based on the first control voltage (Vgs). The first output current (I3) flows through the first load 2, and constitutes the driving current (Id). In this embodiment, the first output module 5 includes a first transistor 51 (e.g., an nMOSFET (N-type metal oxide semiconductor field effect transistor)). The first transistor 51 has a first terminal (e.g., a drain terminal) that serves as the first output terminal of the first output module 5, a second terminal (e.g., a source terminal) that is coupled to a reference node (e.g., ground), and a control terminal (e.g., agate terminal) that serves as the input terminal of the first output module 5.

The control module 3 includes a comparing circuit 31, a capacitor 34, a charging circuit 32 and a discharging circuit 33. The comparing circuit 31 is coupled to the first output terminal of the first output module 5 for receiving a first to-be-controlled voltage (Vo1) thereat, and compares a to-be-compared voltage (Vc), which is associated with the first to-be-controlled voltage (Vo1), with a predetermined reference voltage (Vr1) to generate a comparison signal (S2). The capacitor 34 is coupled between the input terminal of the first output module 5 and the reference node, and provides the first control voltage (Vgs) to the input terminal of the first output module 5. The charging circuit 32 is coupled to the comparing circuit 31 and the input terminal of the first output module 5, receives the comparison signal (S2) from the comparing circuit 31, and is operable to charge the capacitor 34 based on the comparison signal (S2). The discharging circuit 33 is coupled to the comparing circuit 31 and the input terminal of the first output module 5, receives the comparison signal (S2) from the comparing circuit 31, and is operable to discharge the capacitor 34 based on the comparison signal (S2).

In this embodiment, the charging circuit 32 charges the capacitor 34 so as to increase a magnitude of the first control voltage (Vgs) when the comparison signal (S2) indicates that the to-be-compared voltage (Vc) is higher in magnitude than the predetermined reference voltage (Vr1), and the discharging circuit 33 discharges the capacitor 34 so as to decrease the magnitude of the first control voltage (Vgs) when the comparison signal (S2) indicates that the to-be-compared voltage (Vc) is lower in magnitude than the predetermined reference voltage (Vr1).

In this embodiment, the comparing circuit 31 includes a first selecting unit 311 and a first comparator 312. The first selecting unit 311 has a first input terminal that is coupled to the first output terminal of the first output module 5 for receiving the first to-be-controlled voltage (Vo1) thereat, a second input terminal that is used to receive a predetermined bias voltage (Vd) which is higher than the predetermined reference voltage (Vr1), and an output terminal. The first selecting unit 311 provides at the output terminal thereof a minimum one of the first to-be-controlled voltage (Vo1) and the predetermined bias voltage (Vd) to serve as the to-be-compared voltage (Vc). The first comparator 312 has a first input terminal (e.g., a non-inverting input terminal) that is coupled to the output terminal of the first selecting unit 311 for receiving the to-be-compared voltage (Vc) therefrom, a second input terminal (e.g., an inverting input terminal) that receives the predetermined reference voltage (Vr1), and an output terminal that is coupled to the charging circuit 32 and the discharging circuit 33 for providing the comparison signal (S2) thereto. As a result, the first to-be-controlled voltage (Vo1) serves as the to-be-compared voltage (Vc); and the comparison signal (S2) is at a logic high level when the first to-be-controlled voltage (Vo1) is higher than the predetermined reference voltage (Vr1), and at a logic low level when the first to-be-controlled voltage (Vo1) is lower than the predetermined reference voltage (Vr1).

Figure 2:
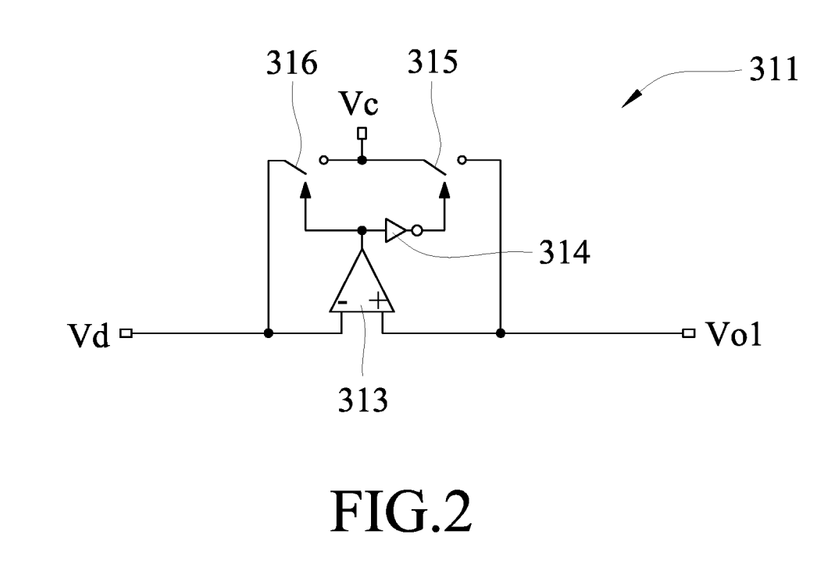
FIG. 2 is a circuit diagram illustrating a first selecting unit of the first embodiment.

Referring to FIG. 2, in this embodiment, the first selecting unit 311 includes a second comparator 313, a first inverter 314, a first switch 315 and a second switch 316. The second comparator 313 has a non-inverting input terminal that serves as one of the first and second input terminals of the first selecting unit 311 (e.g., the first input terminal of the first selecting unit 311), an inverting input terminal that serves as the other one of the first and second input terminals of the first selecting unit 311 (e.g., the second input terminal of the first selecting unit 311), and an output terminal. The first inverter 314 has an input terminal that is coupled to the output terminal of the second comparator 313, and an output terminal. The first switch 315 has a first terminal that is coupled to the non-inverting input terminal of the second comparator 313, a second terminal that serves as the output terminal of the first selecting unit 311, and a control terminal that is coupled to the output terminal of the first inverter 314. The second switch 316 has a first terminal that is coupled to the inverting input terminal of the second comparator 313, a second terminal that is coupled to the second terminal of the first switch 315, and a control terminal that is coupled to the output terminal of the second comparator 313.

Referring back to FIG. 1, in this embodiment, the charging circuit 32 includes a third switch 321 and a charging current source 322. The first switch 321 has a first terminal, a second terminal that is coupled to the input terminal of the first output module 5, and a control terminal that is coupled to the comparing circuit 31 for receiving the comparison signal (S2) therefrom. The first switch 321 conducts when the comparison signal (S2) is at the logic high level, and does not conduct when the comparison signal (S2) is at the logic low level. The charging current source 322 is coupled to the first terminal of the third switch 321, and provides a charging current (I1) that flows through the third switch 321 (from the first terminal to the second terminal) so as to charge the capacitor 34 when the third switch 321 conducts.

In this embodiment, the discharging circuit 33 includes a second inverter 331, a fourth switch 332 and a discharging current source 333. The second inverter 331 has an input terminal that is coupled to the comparing circuit 31 for receiving the comparison signal (S2) therefrom, and an output terminal. The fourth switch 332 has a first terminal that is coupled to the input terminal of the first output module 5, a second terminal, and a control terminal that is coupled to the output terminal of the second inverter 331. The fourth switch 332 conducts when the comparison signal (S2) is at the logic low level, and does not conduct when the comparison signal (S2) is at the logic high level. The discharging current source 333 is coupled to the second terminal of the fourth switch 332, and provides a discharging current (I2) that flows through the fourth switch 332 (from the first terminal to the second terminal) so as to discharge the capacitor 34 when the fourth switch 332 conducts.

Figure 3:
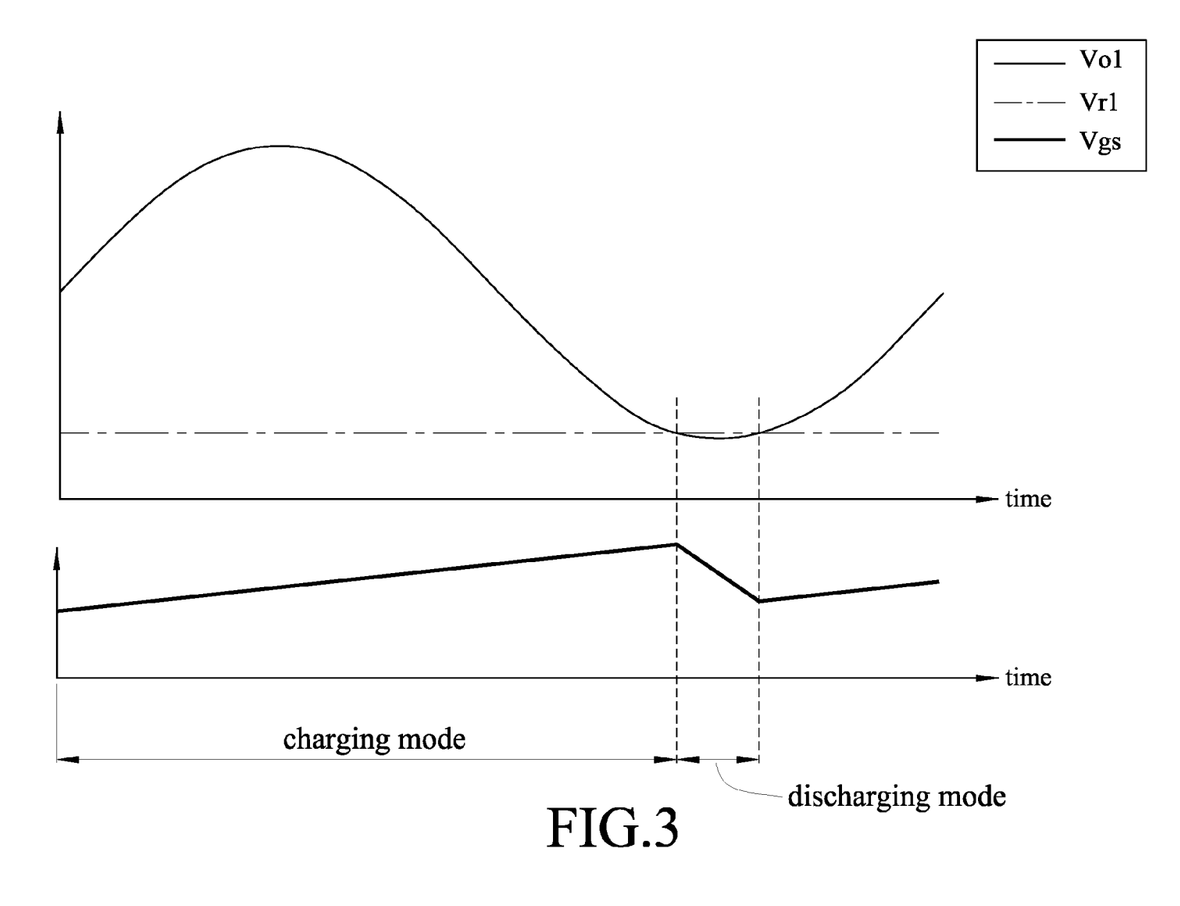
FIG. 3 is a timing diagram illustrating a first to-be-controlled voltage, a predetermined reference voltage and a first control voltage of the first embodiment.

Referring to FIGS. 1 and 3, under a circumstance where each of a voltage (Vin) provided by the power factor correcting module 12 and the first to-be-controlled voltage (Vo1) has a ripple component, the voltage control device 6 operates alternately in a charging mode and a discharging mode.

In the charging mode, the first to-be-controlled voltage (Vo1) is higher than the predetermined reference voltage (Vr1), the comparison signal (S2) is at the logic high level, the third switch 321 conducts, the fourth switch 332 does not conduct, the charging current (I1) flows through the conducting third switch 321 to charge the capacitor 34, the first control voltage (Vgs) increases, and the first output current (I3) increases. When the first output current (I3) rises above the supply current, the voltage (Vin) decreases, and the first to-be-controlled voltage (Vo1) decreases as well.

In the discharging mode, the first to-be-controlled voltage (Vo1) is lower than the predetermined reference voltage (Vr1), the comparison signal (S2) is at the logic low level, the third switch 321 does not conduct, the fourth switch 332 conducts, the discharging current (I2) flows through the conducting fourth switch 332 to discharge the capacitor 34, the first control voltage (Vgs) decreases, and the first output current (I3) decreases. When the first output current (I3) drops below the supply current, the voltage (Vin) increases, and the first to-be-controlled voltage (Vo1) increases as well.

As a result, the first to-be-controlled voltage (Vo1) has a valley substantially equaling the predetermined reference voltage (Vr1), and the driving current (Id) has a relatively small ripple component.

It is noted that, in this embodiment, the discharging current (I2) is greater than (e.g., nine times) the charging current (I1), and therefore a discharging rate of the capacitor 34 is greater than (e.g., nine times) a charging rate of the capacitor 34. In addition, the predetermined reference voltage (Vr1) is sufficient to make the first transistor 51 operate in a saturation region. Moreover, the first output module 5 and the control module 3 may be fabricated in one single integrated circuit. However, the disclosure is not limited thereto.

It is noted that, in a modification of this embodiment, the first and second input terminals of the first comparator 312 may be an inverting input terminal and a non-inverting input terminal, respectively; the third switch 321 may conduct when the comparison signal (S2) is at the logic low level, and may not conduct when the comparison signal (S2) is at the logic high level; and the fourth switch 332 may conduct when the comparison signal (S2) is at the logic high level, and may not conduct when the comparison signal (S2) is at the logic low level.

Figure 4:
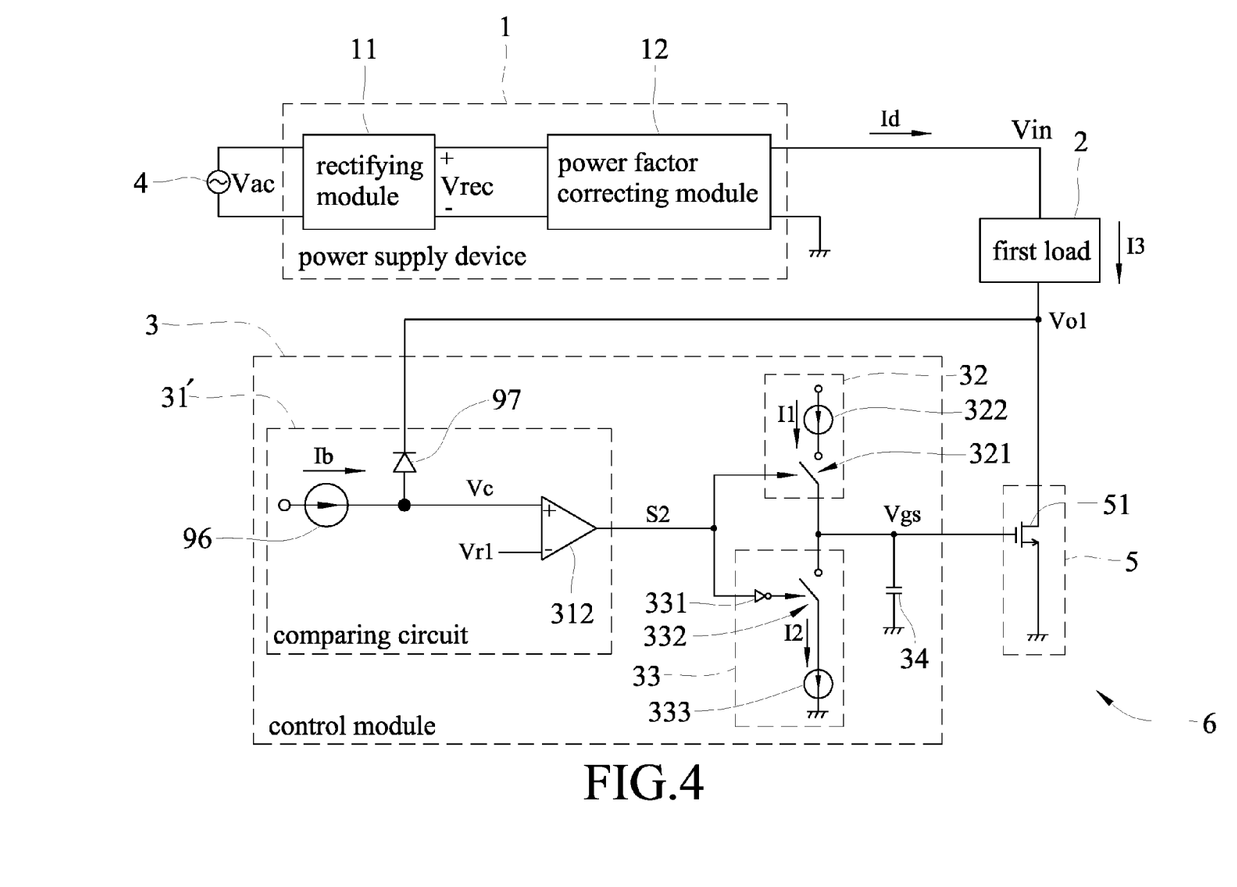
FIG. 4 is a circuit block diagram illustrating a second embodiment of the driving system according to the disclosure.

Referring to FIG. 4, a second embodiment of the driving system according to the disclosure is a modification of the first embodiment, and differs from the first embodiment in that a first diode 97 and a bias current source 96 are used in the comparing circuit 31' to replace the first selecting unit 311 (see FIG. 1).

In the second embodiment, the first diode 97 has an anode, and a cathode that is coupled to the first output terminal of the first output module 5 for receiving the first to-be-controlled voltage (Vo1) thereat. The bias current source 96 is coupled to the anode of the first diode 97 for providing a bias current (Ib) thereto. A voltage at the anode of the first diode 97 serves as the to-be-compared voltage (Vc). The first diode 97 and the bias current source 96 cooperatively make the to-be-compared voltage (Vc) substantially equal the first to-be-controlled voltage (Vo1). The first input terminal of the first comparator 312 is coupled to the anode of the first diode 97 for receiving the to-be-compared voltage (Vc) therefrom.

Figure 5:
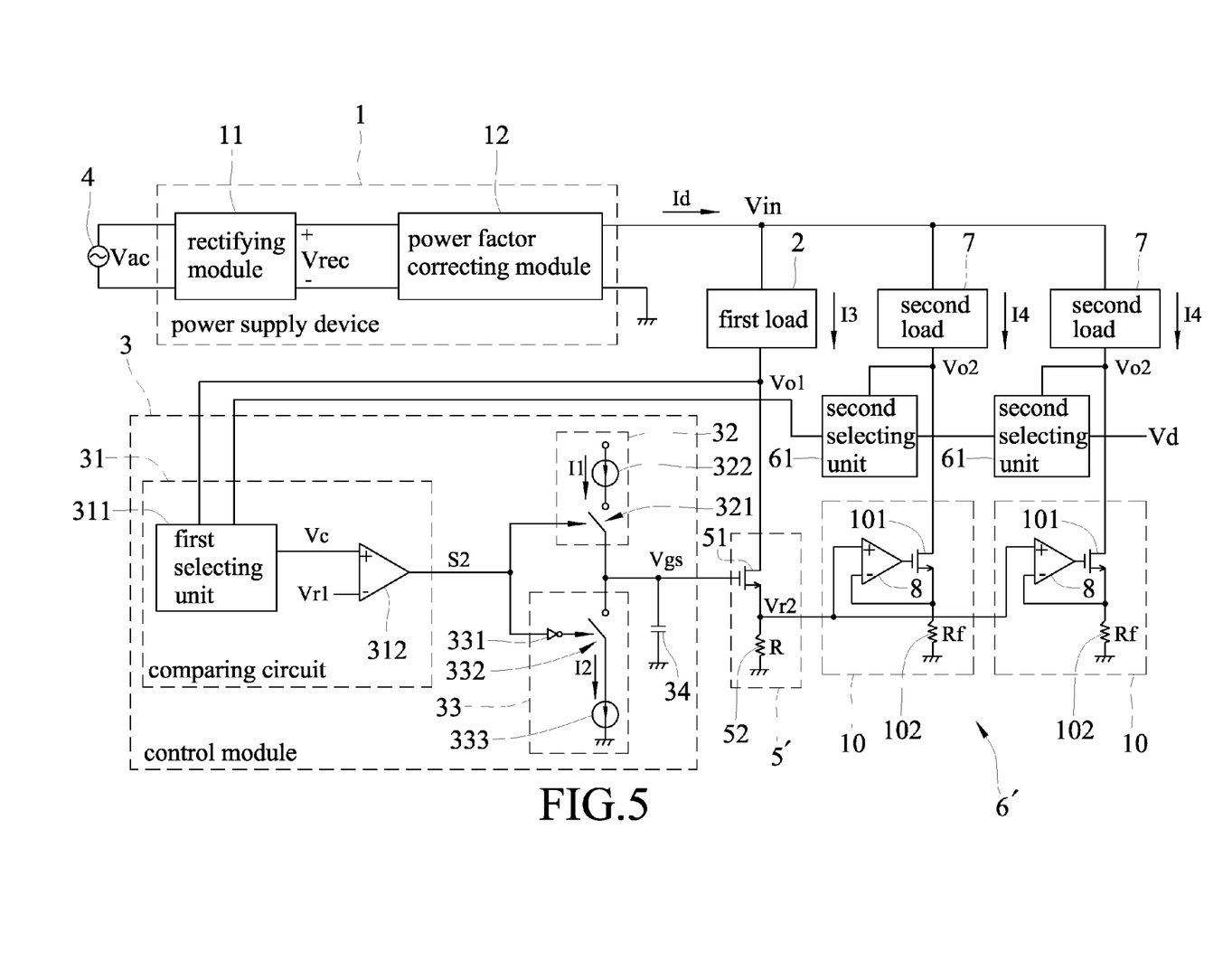
FIG. 5 is a circuit block diagram illustrating a third embodiment of the driving system according to the disclosure.

Referring to FIG. 5, a third embodiment of the driving system according to the disclosure is a modification of the first embodiment, and differs from the first embodiment in that the power factor correcting module 12 is used to be coupled further to a number (N) of second loads 7 (e.g., light emitting devices), where N≥1 (e.g., N=2 as shown in FIG. 5), and that the driving current (Id) further drives the second loads 7, and in the voltage control device 6'.

In the third embodiment, the first output module 5' further has a second output terminal, and provides a second control voltage (Vr2) at the second output terminal thereof based on the first control voltage (Vgs). The first output module 5' further includes a first resistor 52 that has a resistance of R, and that is coupled between the second terminal of the first transistor 51 and the reference node. The second terminal of the first transistor 51 serves as the second output terminal of the first output module 5'.

In addition, the voltage control device 6' further includes a number (N) of second output modules 10 and a number (N) of second selecting units 61.

Each second output module 10 has an input terminal that is coupled to the second output terminal of the first output module 5' for receiving the second control voltage (Vr2) therefrom, and an output terminal that is used to be coupled to a respective second load 7. Each second output module 10 provides a respective second output current (I4) at the output terminal thereof based on the second control voltage (Vr2). Each second output module 10 includes a second transistor 101 (e.g., an nMOSFET), an amplifier 8 and a second resistor 102. For each second output module 10, the second transistor 101 has a first terminal (e.g., a drain terminal) that serves as the output terminal of the second output module 10, a second terminal (e.g., a source terminal), and a control terminal (e.g., a gate terminal); the amplifier 8 has a non-inverting input terminal that serves as the input terminal of the second output module 10, an inverting input terminal that is coupled to the second terminal of the second transistor 101, and an output terminal that is coupled to the control terminal of the second transistor 101; the second resistor 102 has a resistance of Rf, and is coupled between the second terminal of the second transistor 101 and the reference node.

Each second output current (I4) flows through the respective second load 7. The first and second output currents (I3, I4) cooperatively constitute the driving current (Id). In other words, each of the first and second output currents (I3, I4) is a portion of the driving current (Id). The first output current (I3) has a magnitude of (Vr2/R). Each second output current (I4) has a magnitude of (Vr2/Rf). The first and second resistors 52, 102 may have the same resistance (i.e., R=Rf), or may have different resistances (i.e., R≠Rf). When the first and second resistors 52, 102 have the same resistance (i.e., R=Rf), the first and second output currents (I3, I4) are equal, by which not only current division but also current balance among the first and second loads 2, 7 can be attained.

Figure 6:
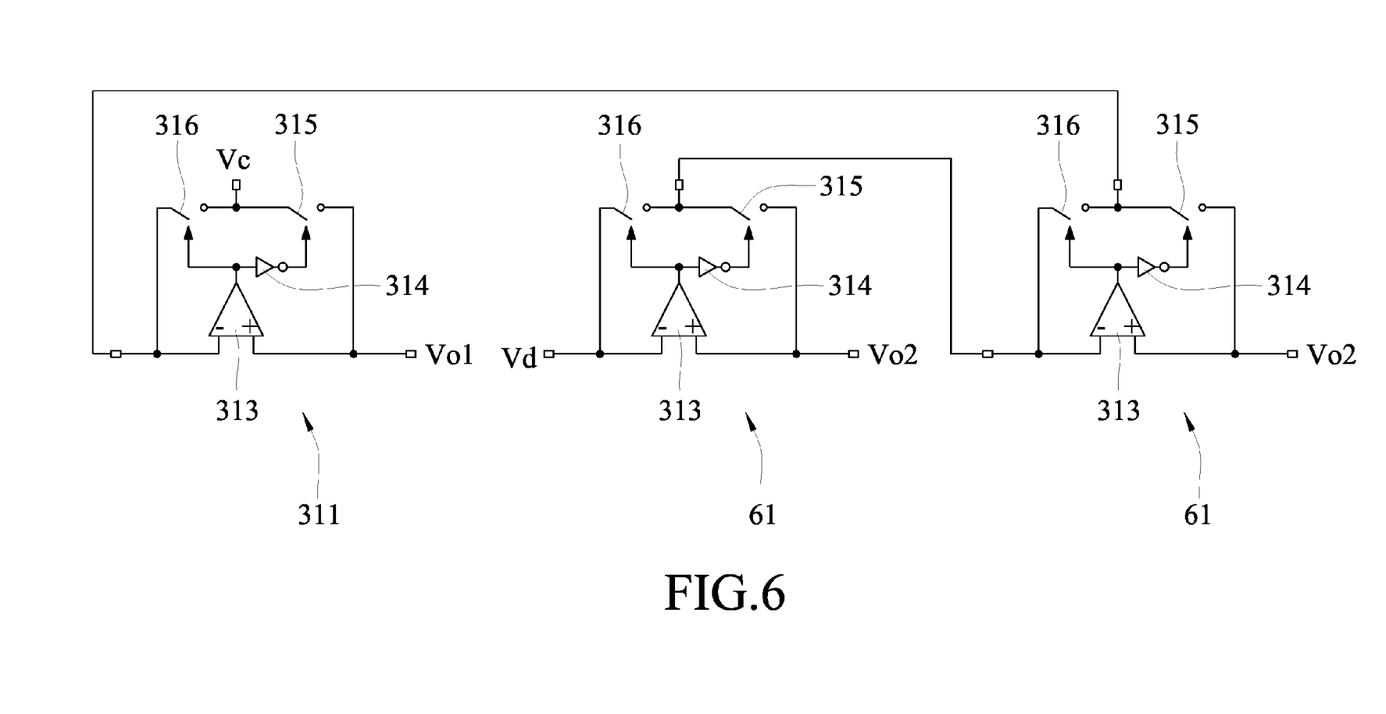
FIG. 6 is a circuit diagram illustrating the first selecting unit and second selecting units of the third embodiment.

Each second selecting unit 61 has a first input terminal that is coupled to the output terminal of a respective second output module 10 for receiving the second to-be-controlled voltage (Vo2) thereat, a second input terminal and an output terminal. Each second selecting unit 61 provides at the output terminal thereof a minimum one of the second to-be-controlled voltage (Vo2) and a voltage received at the second input terminal thereof. When N=1, the second input terminal of the first selecting unit 311 is coupled to the output terminal of the second selecting unit 61 for receiving the voltage thereat, and the second input terminal of the second selecting unit 61 is used to receive a predetermined bias voltage (Vd) higher than the predetermined reference voltage (Vr1). When N≥2, the second input terminal of the first selecting unit 311 is coupled to the output terminal of a first one of the second selecting units 61 for receiving the voltage thereat, the second input terminal of an $(n-1)^{th}$ one of the second selecting units 61 is coupled to the output terminal of an $n^{th}$ one of the second selecting units 61 for receiving the voltage thereat, and the second input terminal of an $N^{th}$ one of the second selecting units 61 is used to receive the predetermined bias voltage (Vd), where 2≤n≤N. Each second selecting unit 61 may have an implementation identical to that of the first selecting unit 311 as shown in FIG. 6. The first and second selecting units 311, 61 cooperatively select a minimum one of the first and second to-be-controlled voltages (Vo1, Vo2) to serve as the to-be-compared voltage (Vc), and therefore the to-be-compared voltage (Vc) is associated with the first and second to-be-controlled voltages (Vo1, Vo2).

Under a circumstance where each of the voltage (Vin) and the first and second to-be-controlled voltages (Vo1, Vo2) has a ripple component, the voltage control device 6' operates alternately in the charging mode and the discharging mode.

In the charging mode, the minimum one of the first and second to-be-controlled voltages (Vo1, Vo2) is higher than the predetermined reference voltage (Vr1), the comparison signal (S2) is at the logic high level, the third switch 321 conducts, the fourth switch 332 does not conduct, the charging current (I1) flows through the conducting third switch 321 to charge the capacitor 34, the first control voltage (Vgs) increases, the second control voltage (Vr2) increases, and the first and second output currents (I3, I4) increase. When a sum of the first and second output currents (I3, I4) rises above the supply current, the voltage (Vin) decreases, and the first and second to-be-controlled voltages (Vo1, Vo2) decrease as well.

In the discharging mode, the minimum one of the first and second to-be-controlled voltages (Vo1, Vo2) is lower than the predetermined reference voltage (Vr1), the comparison signal (S2) is at the logic low level, the third switch 321 does not conduct, the fourth switch 332 conducts, the discharging current (I2) flows through the conducting fourth switch 332 to discharge the capacitor 34, the first control voltage (Vgs) decreases, the second control voltage (Vr2) decreases, and the first and second output currents (I3, I4) decrease. When a sum of the first and second output currents (I3, I4) drops below the supply current, the voltage (Vin) increases, and the first and second to-be-controlled voltages (Vo1, Vo2) increase as well.

As a result, the minimum one of the first and second to-be-controlled voltages (Vo1, Vo2) has a valley substantially equaling the predetermined reference voltage (Vr1), and the driving current (Id) has a relatively small ripple component.

It is noted that the predetermined reference voltage (Vr1) is sufficient to make each of the first and second transistors 51, 101 operate in the saturation region. In addition, the first output module 5' and the control module 3 may be fabricated in one integrated circuit while each second output module 10 and the respective second selecting unit 61 may be fabricated in another respective integrated circuit. However, the disclosure is not limited thereto.

Figure 7:
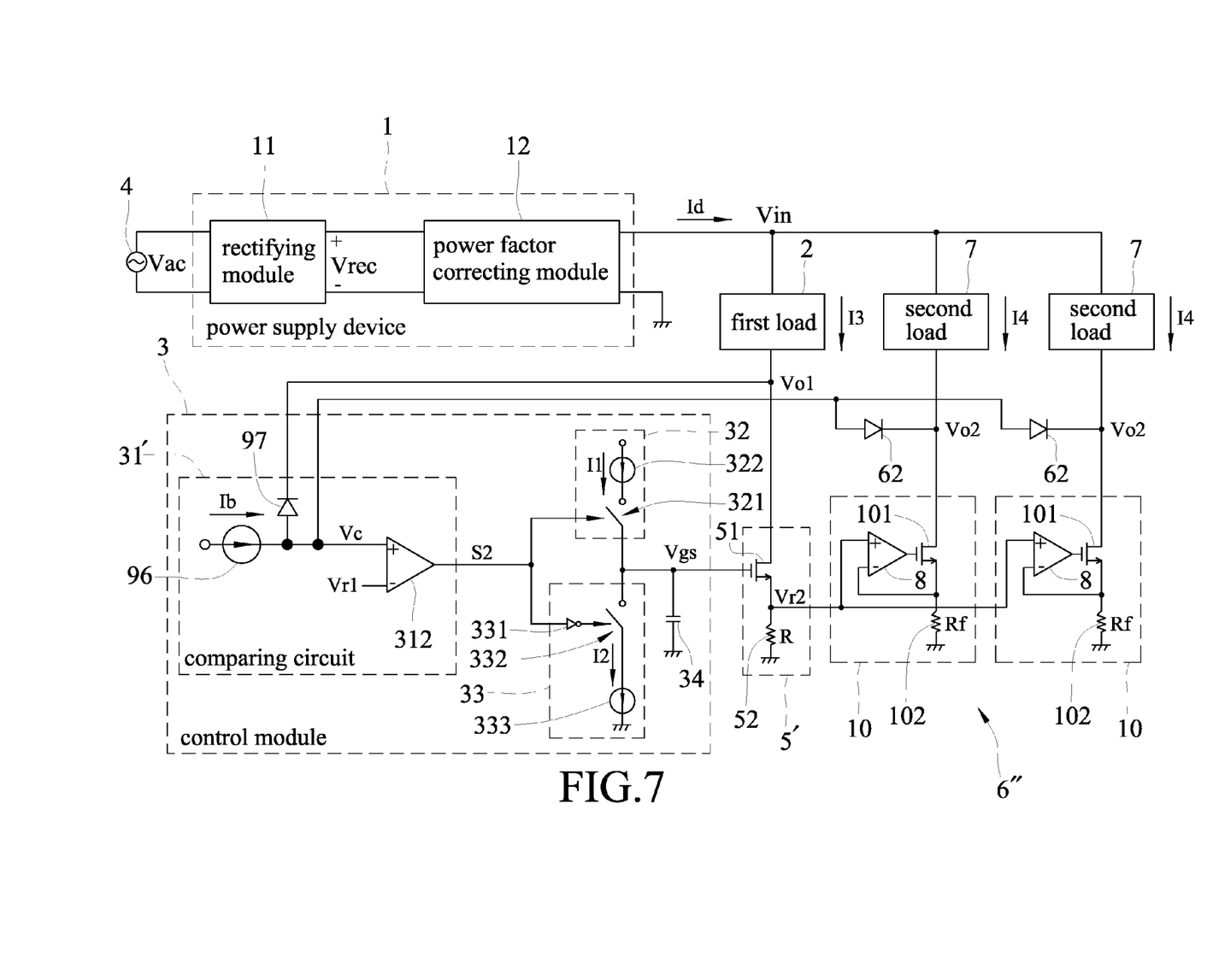
FIG. 7 is a circuit block diagram illustrating a fourth embodiment of the driving system according to the disclosure.

Referring to FIG. 7, a fourth embodiment of the driving system according to the disclosure is a modification of the third embodiment, and differs from the third embodiment in that a first diode 97 and a bias current source 96 are used in the comparing circuit 31' to replace the first selecting unit 311 (see FIG. 5), and that a number (N) of second diodes 62 are used in the voltage control device 6" to respectively replace the second selecting units 61 (see FIG. 5).

In the fourth embodiment, the first diode 97 has an anode, and a cathode that is coupled to the first output terminal of the first output module 5' for receiving the first to-be-controlled voltage (Vo1) thereat. The bias current source 96 is coupled to the anode of the first diode 97 for providing a bias current (Ib) thereto. A voltage at the anode of the first diode 97 serves as the to-be-compared voltage (Vc). The first input terminal of the first comparator 312 is coupled to the anode of the first diode 97 for receiving the to-be-compared voltage (Vc) therefrom. Each second diode 62 has an anode that is coupled to the anode of the first diode 97, and a cathode that is coupled to the output terminal of a respective second output module 10 for receiving the second to-be-controlled voltage (Vo2) thereat. The first and second diodes 97, 62 and the bias current source 96 cooperatively make the to-be-compared voltage (Vc) substantially equal to a minimum one of the first and second to-be-controlled voltages (Vo1, Vo2).

It is noted that the first output module 5' and the control module 3 may be fabricated in one integrated circuit while each second output module 10 and the respective second diode 62 may be fabricated in another respective integrated circuit. However, the disclosure is not limited thereto.

Figure 8:
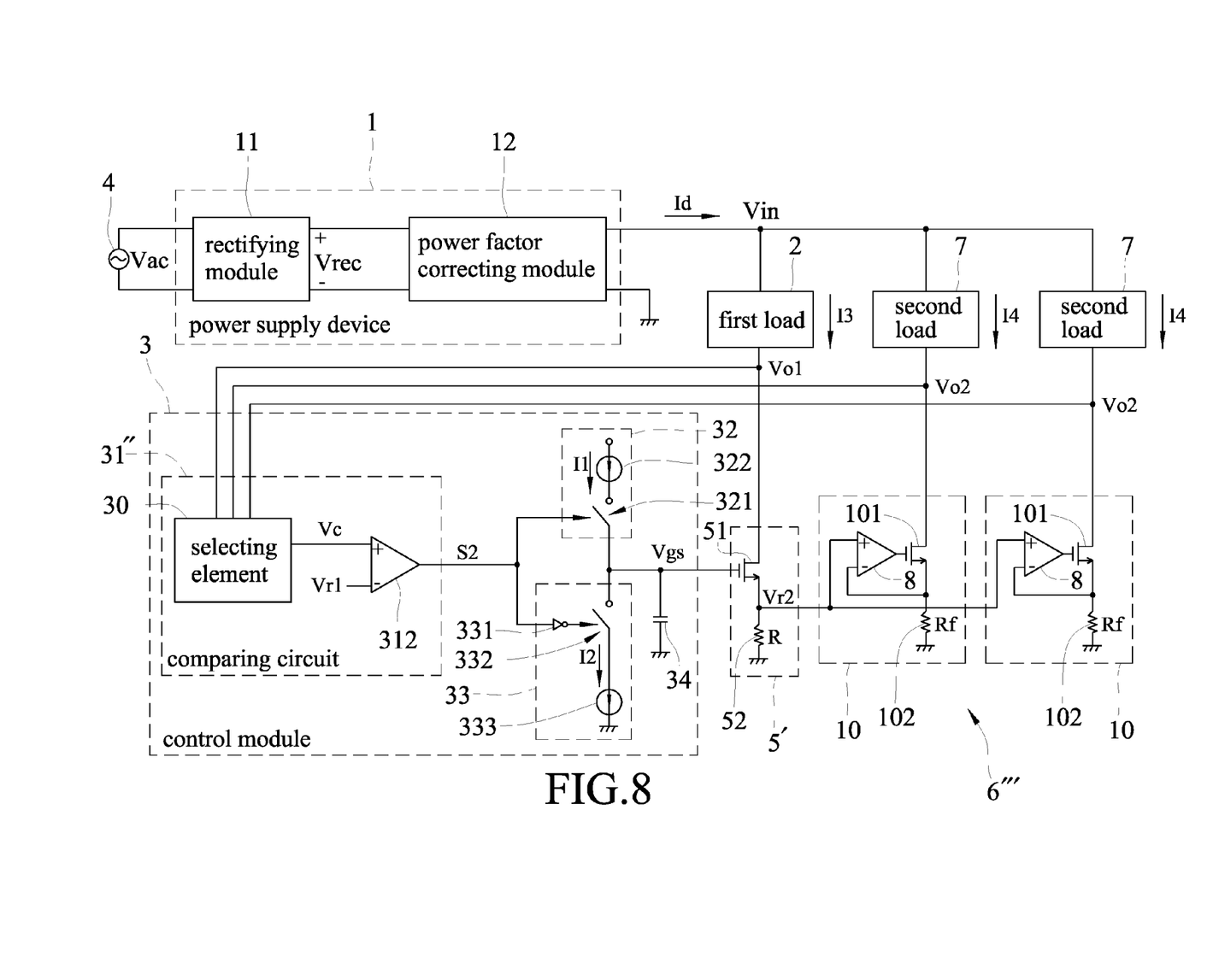
FIG. 8 is a circuit block diagram illustrating a fifth embodiment of the driving system according to the disclosure.

Referring to FIG. 8, a fifth embodiment of the driving system according to the disclosure is a modification of the third embodiment, and differs from the third embodiment in that a selecting element 30 is used in the comparing circuit 31" to replace the first selecting unit 311 (see FIG. 5), and that the second selecting units 61 (see FIG. 5) are omitted in the voltage control device 6'''.

In the fifth embodiment, the selecting element 30 is coupled to the first output terminal of the first output module 5' and the output terminals of the second output modules 10 for receiving the first and second to-be-controlled voltages (Vo1, Vo2) respectively thereat, and selects a minimum one of the first and second to-be-controlled voltages (Vo1, Vo2) to serve as the to-be-compared voltage (Vc). The first input terminal of the first comparator 312 is coupled to the selecting element 30 for receiving the to-be-compared voltage (Vc) therefrom.

Figure 9:
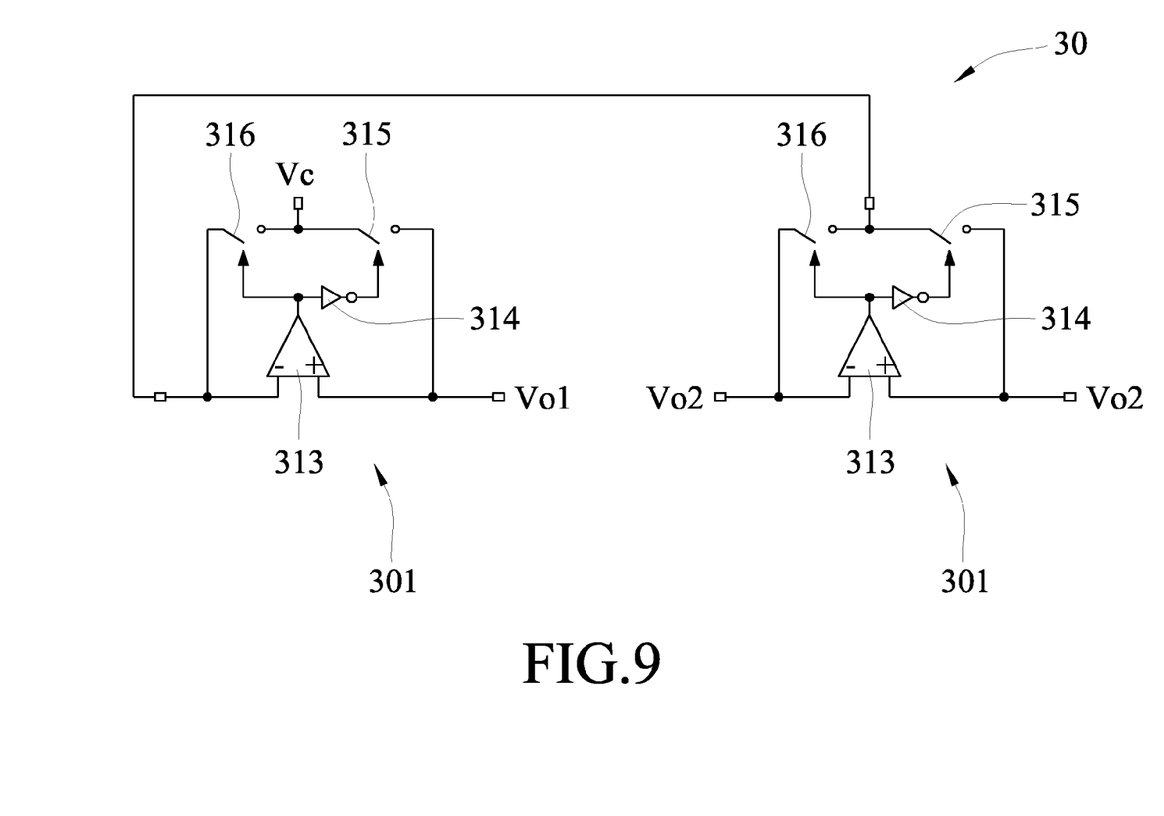
FIG. 9 is a circuit diagram illustrating a first implementation of a selecting element of the fifth embodiment.

Referring to FIGS. 8 and 9, a first implementation of the selecting element 30 includes a number (N) of third selecting units 301, where the number (N) is equal to a number of the second output modules 10. Each third selecting unit 301 has a first input terminal, a second input terminal and an output terminal, and provides at the output terminal thereof a minimum one of voltages received respectively at the first and second input terminals thereof. When N=1, the output terminal of the third selecting unit 301 provides the to-be-compared voltage (Vc), the first input terminal of the third selecting unit 301 is coupled to the first output terminal of the first output module 5' for receiving the first to-be-controlled voltage (Vo1) thereat, and the second input terminal of the third selecting unit 301 is coupled to the output terminal of the second output module 10 for receiving the second to-be-controlled voltage (Vo2) thereat. When N≥2, the output terminal of a first one of the third selecting units 301 provides the to-be-compared voltage (Vc), the first input terminal of the first one of the third selecting units 301 is coupled to the first output terminal of the first output module 5' for receiving the first to-be-controlled voltage (Vo1) thereat, the second input terminal of an $(n-1)^{th}$ one of the third selecting units 301 is coupled to the output terminal of an $n^{th}$ one of the third selecting units 301 for receiving a voltage thereat, the first input terminal of the $n^{th}$ one of the third selecting units 301 is coupled to the output terminal of an $(n-1)^{th}$ one of the second output modules 10 for receiving the second to-be-controlled voltage (Vo2) thereat, and the second input terminal of an $N^{th}$ one of the third selecting units 301 is coupled to the output terminal of an $N^{th}$ one of the second output modules 10 for receiving the second to-be-controlled voltage (Vo2) thereat, where $2 \leq n \leq N$. Each third selecting unit 301 may have an implementation identical to that of the first selecting unit 311 (see FIG. 6).

Figure 10:
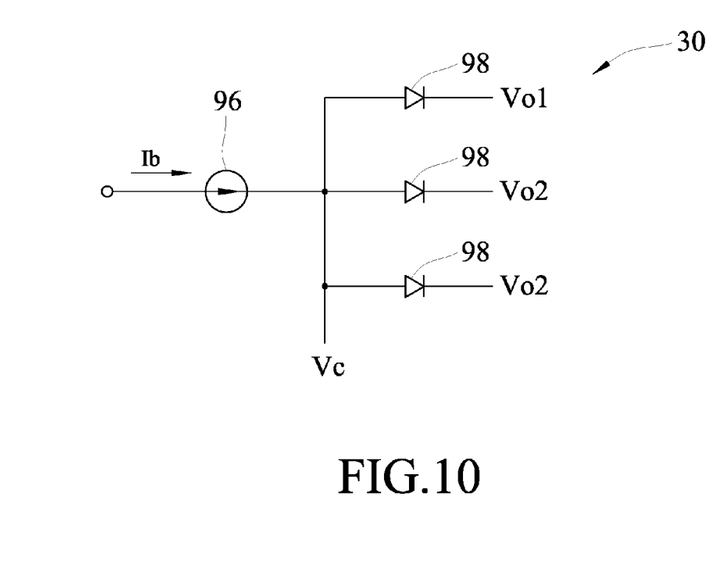
FIG. 10 is a circuit diagram illustrating a second implementation of the selecting element of the fifth embodiment.

Referring to FIGS. 8 and 10, a second implementation of the selecting element 30 includes a number (N+1) of third diodes 98 and a bias current source 96. Each third diode 98 has an anode that is coupled to the anode(s) of the other third diode(s) 98, and a cathode that is coupled to a corresponding one of the first output terminal of the first output module 5' and the output terminals of the second output modules 10 for receiving a corresponding one of the first and second to-be-controlled voltages (Vo1, Vo2) thereat. The bias current source 96 is coupled to the anodes of the third diodes 98 for providing a bias current (Ib) thereto. A voltage at the anodes of the diodes 98 serves as the to-be-compared voltage (Vc).

It is noted that, in this embodiment, the first output module 5' and the control module 3 may be fabricated in one integrated circuit while each second output module 10 may be fabricated in another respective integrated circuit. However, the disclosure is not limited thereto.

Figure 11:
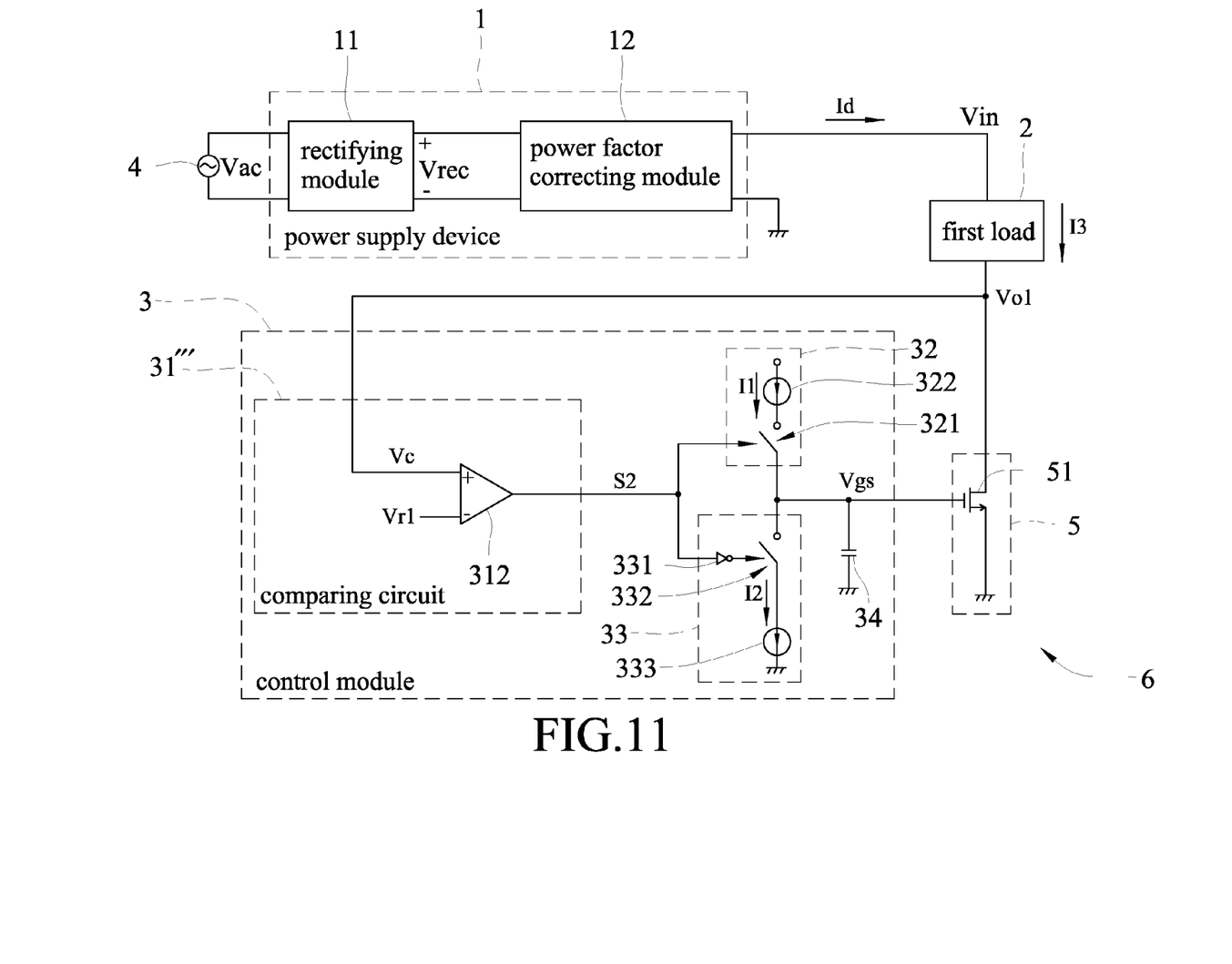
FIG. 11 is a circuit block diagram illustrating a sixth embodiment of the driving system according to the disclosure.

Referring to FIG. 11, a sixth embodiment of the driving system according to the disclosure is a modification of the first embodiment, and differs from the first embodiment in that the first selecting unit 311 (see FIG. 1) is omitted in the comparing circuit 31'''.

In the sixth embodiment, the first input terminal of the first comparator 312 is coupled to the first output terminal of the first output module 5 for receiving the first to-be-controlled voltage (Vo1) thereat that serves as the to-be-compared voltage (Vc).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment (s), it is understood that the disclosure is not limited to the disclosed embodiment(s) but is intended to cover various arrangements included within the spirit and scope of the broadest interpretation so as to encompass all such modifications and equivalent arrangements.

What is claimed is:

1. A voltage control device comprising:
   a first output module having an input terminal that receives a first control voltage, and a first output terminal, and providing a first output current at said first output terminal thereof based on the first control voltage; and
   a control module including:
      a comparing circuit coupled to said first output terminal of said first output module for receiving a first to-be-controlled voltage thereat, and comparing a to-be-compared voltage, which is associated at least with the first to-be-controlled voltage, with a predetermined reference voltage to generate a comparison signal;
      a capacitor coupled between said input terminal of said first output module and a reference node, and providing the first control voltage to said input terminal of said first output module;
      a charging circuit coupled to said comparing circuit and said input terminal of said first output module, receiving the comparison signal from said comparing circuit, and operable to charge said capacitor based on the comparison signal; and
      a discharging circuit coupled to said comparing circuit and said input terminal of said first output module, receiving the comparison signal from said comparing circuit, and operable to discharge said capacitor based on the comparison signal;
   wherein said comparing circuit includes:
      a selecting unit having a first input terminal that is coupled to said first output terminal of said first output module for receiving the first to-be-controlled voltage thereat, a second input terminal and an output terminal, said selecting unit providing at said output terminal thereof a minimum one of the first to-be-controlled voltage and a voltage received at said second input terminal thereof to serve as the to-be-compared voltage; and
      a first comparator having a first input terminal that is coupled to said output terminal of said selecting unit for receiving the to-be-compared voltage therefrom, a second input terminal that receives the predetermined reference voltage, and an output terminal that is coupled to said charging circuit and said discharging circuit for providing the comparison signal thereto.

2. The voltage control device of claim 1, wherein said charging circuit charges said capacitor when the comparison signal indicates that the to-be-compared voltage is higher than the predetermined reference voltage, and said discharging circuit discharges said capacitor when the comparison signal indicates that the to-be-compared voltage is lower than the predetermined reference voltage.

3. The voltage control device of claim 1, wherein said selecting unit includes:
   a second comparator having a non-inverting input terminal that serves as one of said first and second input terminals of said selecting unit, an inverting input terminal that serves as the other one of said first and second input terminals of said selecting unit, and an output terminal;
   an inverter having an input terminal that is coupled to said output terminal of said second comparator, and an output terminal;
   a first switch having a first terminal that is coupled to said non-inverting input terminal of said second comparator, a second terminal that serves as said output terminal of said selecting unit, and a control terminal that is coupled to said output terminal of said inverter; and
   a second switch having a first terminal that is coupled to said inverting input terminal of said second comparator, a second terminal that is coupled to said second terminal of said first switch, and a control terminal that is coupled to said output terminal of said second comparator.

4. The voltage control device of claim 1, wherein said charging circuit includes:
   a switch having a first terminal, a second terminal that is coupled to said input terminal of said first output module, and a control terminal that is coupled to said comparing circuit for receiving the comparison signal therefrom; and
   a charging current source coupled to said first terminal of said switch, and providing a charging current that flows through said switch from said first terminal thereof to said second terminal thereof when said switch conducts.

5. The voltage control device of claim 1, wherein said discharging circuit includes:
   an inverter having an input terminal that is coupled to said comparing circuit for receiving the comparison signal therefrom, and an output terminal;
   a switch having a first terminal that is coupled to said input terminal of said first output module, a second terminal, and a control terminal that is coupled to said output terminal of said inverter; and
   a discharging current source coupled to said second terminal of said switch, and providing a discharging current that flows through said switch from said first terminal thereof to said second terminal thereof when said switch conducts.

6. The voltage control device of claim 1, wherein said first output module includes:
   a transistor having a first terminal that serves as said first output terminal of said first output module, a second terminal that is coupled to the reference node, and a control terminal that serves as said input terminal of said first output module.

7. The voltage control device of claim 6, wherein the predetermined reference voltage is sufficient to make said transistor operate in a saturation region.

8. A voltage control device comprising:
   a first output module having an input terminal that receives a first control voltage, and a first output terminal, and providing a first output current at said first output terminal thereof based on the first control voltage; and
   a control module including:
      a comparing circuit coupled to said first output terminal of said first output module for receiving a first to-be-controlled voltage thereat, and comparing a to-be-compared voltage, which is associated at least with the first to-be-controlled voltage, with a predetermined reference voltage to generate a comparison signal;
      a capacitor coupled between said input terminal of said first output module and a reference node, and providing the first control voltage to said input terminal of said first output module;
      a charging circuit coupled to said comparing circuit and said input terminal of said first output module, receiving the comparison signal from said comparing circuit, and operable to charge said capacitor based on the comparison signal; and
      a discharging circuit coupled to said comparing circuit and said input terminal of said first output module, receiving the comparison signal from said comparing circuit, and operable to discharge said capacitor based on the comparison signal;
   wherein said comparing circuit includes:
      a diode having an anode, and a cathode that is coupled to said first output terminal of said first output module for receiving the first to-be-controlled voltage thereat;
      a bias current source coupled to said anode of said diode for providing a bias current thereto; and
      a comparator having a first input terminal that is coupled to said anode of said diode for receiving a voltage thereat which serves as the to-be-compared voltage, a second input terminal that receives the predetermined reference voltage, and an output terminal that is coupled to said charging circuit and said discharging circuit for providing the comparison signal thereto.

9. A voltage control device comprising:
   a first output module having an input terminal that receives a first control voltage, a first output terminal and a second output terminal, said first output module providing a first output current at said first output terminal thereof based on the first control voltage, and providing a second control voltage at said second output terminal thereof based on the first control voltage;
   a number (N) of second output modules, each of which has an input terminal that is coupled to said second output terminal of said first output module for receiving the second control voltage therefrom, and an output terminal, and each of which provides a respective second output current at said output terminal thereof based on the second control voltage, where N≥1; and
   a control module including:
      a comparing circuit coupled to said first output terminal of said first output module for receiving a first to-be-controlled voltage thereat, and comparing a to-be-compared voltage, which is associated with the first to-be-controlled voltage and a number (N) of second to-be-controlled voltages respectively at said output terminals of said second output modules, with a predetermined reference voltage to generate a comparison signal;
      a capacitor coupled between said input terminal of said first output module and a reference node, and providing the first control voltage to said input terminal of said first output module;
      a charging circuit coupled to said comparing circuit and said input terminal of said first output module, receiving the comparison signal from said comparing circuit, and operable to charge said capacitor based on the comparison signal; and
      a discharging circuit coupled to said comparing circuit and said input terminal of said first output module, receiving the comparison signal from said comparing circuit, and operable to discharge said capacitor based on the comparison signal;
   wherein said first output module includes:
      a first transistor having a first terminal, a second terminal and a control terminal that serve respectively as said first and second output terminals and said input terminal of said first output module; and
      a first resistor coupled between said second terminal of said first transistor and the reference node.

10. The voltage control device of claim 9, wherein each of said second output modules includes:
   a second transistor having a first terminal that serves as said output terminal of said second output module, a second terminal, and a control terminal;

an amplifier having a non-inverting input terminal that serves as said input terminal of said second output module, an inverting input terminal that is coupled to said second terminal of said second transistor, and an output terminal that is coupled to said control terminal of said second transistor; and a second resistor coupled between said second terminal of said second transistor and the reference node.

11. The voltage control device of claim 10, wherein the predetermined reference voltage is sufficient to make each of said first and second transistors operate in a saturation region.

12. The voltage control device of claim 9, wherein said comparing circuit includes:

a selecting element coupled to said first output terminal of said first output module and said output terminals of said second output modules for receiving the first and second to-be-controlled voltages respectively thereat, and selecting a minimum one of the first and second to-be-controlled voltages to serve as the to-be-compared voltage; and a comparator having a first input terminal that is coupled to said selecting element for receiving the to-be-compared voltage therefrom, a second input terminal that receives the predetermined reference voltage, and an output terminal that is coupled to said charging circuit and said discharging circuit for providing the comparison signal thereto.

13. The voltage control device of claim 9, wherein said comparing circuit includes:

a first selecting unit having a first input terminal that is coupled to said first output terminal of said first output module for receiving the first to-be-controlled voltage thereat, a second input terminal and an output terminal, said first selecting unit providing at said output terminal thereof a minimum one of the first to-be-controlled voltage and a voltage received at said second input terminal thereof to serve as the to-be-compared voltage; and a comparator having a first input terminal that is coupled to said output terminal of said first selecting unit for receiving the to-be-compared voltage therefrom, a second input terminal that receives the predetermined reference voltage, and an output terminal that is coupled to said charging circuit and said discharging circuit for providing the comparison signal thereto;

said voltage control device further comprising a number (N) of second selecting units, each of which has a first input terminal that is coupled to said output terminal of a respective one of said second output modules for receiving the second to-be-controlled voltage thereat, a second input terminal and an output terminal, and each of which provides at said output terminal thereof a minimum one of the second to-be-controlled voltage and a voltage received at said second input terminal thereof;

when N=1, said second input terminal of said first selecting unit being coupled to said output terminal of said second selecting unit for receiving the voltage thereat;

when N≥2, said second input terminal of said first selecting unit being coupled to said output terminal of a first one of said second selecting units for receiving the voltage thereat, and said second input terminal of an $(n-1)^{th}$ one of said second selecting units being coupled to said output terminal of an $n^{th}$ one of said second selecting units for receiving the voltage thereat, where 2≤n≤N.

14. The voltage control device of claim 9, wherein said comparing circuit includes:

a first diode having an anode, and a cathode that is coupled to said first output terminal of said first output module for receiving the first to-be-controlled voltage thereat;

a bias current source coupled to said anode of said first diode for providing a bias current thereto; and a comparator having a first input terminal that is coupled to said anode of said first diode for receiving a voltage thereat which serves as the to-be-compared voltage, a second input terminal that receives the predetermined reference voltage, and an output terminal that is coupled to said charging circuit and said discharging circuit for providing the comparison signal thereto;

said voltage control device further comprising a number (N) of second diodes, each of which has an anode that is coupled to said anode of said first diode, and a cathode that is coupled to said output terminal of a respective one of said second output modules for receiving the second to-be-controlled voltage thereat.

* * * * *